United States Patent [19]

Ishiwata et al.

[11] Patent Number: 5,177,627
[45] Date of Patent: Jan. 5, 1993

[54] ELECTRODE PLATE WITH CONDUCTIVE COLOR FILTER

[75] Inventors: Kazuya Ishiwata, Yokosuka; Yuichi Masaki, Kawasaki, both of Japan

[73] Assignee: Canon Kabushiki Kaisha, Tokyo, Japan

[21] Appl. No.: 750,506

[22] Filed: Aug. 27, 1991

[30] Foreign Application Priority Data

Aug. 30, 1990 [JP] Japan .................................. 2-226586

[51] Int. Cl.⁵ .................. G02F 1/1335; G02F 1/1343
[52] U.S. Cl. ........................................ 359/68; 359/67; 359/87
[58] Field of Search .............................. 359/67, 87, 68

[56] References Cited

U.S. PATENT DOCUMENTS

| | | | |
|---|---|---|---|
| 4,591,240 | 5/1986 | Masaki et al. | 350/339 R |
| 4,648,691 | 3/1987 | Oguchi et al. | 359/87 |
| 5,082,351 | 1/1992 | Fergason | 359/51 |

FOREIGN PATENT DOCUMENTS

| | | | |
|---|---|---|---|
| 3523440 | 1/1987 | Fed. Rep. of Germany | 359/87 |
| 57-016407 | 1/1982 | Japan . | |
| 57-074707 | 5/1982 | Japan . | |
| 58-046325 | 3/1983 | Japan . | |
| 0002919 | 1/1985 | Japan | 359/87 |
| 60-078401 | 5/1985 | Japan . | |
| 60-129707 | 7/1985 | Japan . | |
| 60-184202 | 9/1985 | Japan . | |
| 60-184203 | 9/1985 | Japan . | |
| 60-184204 | 9/1985 | Japan . | |
| 60-184205 | 9/1985 | Japan . | |
| 0263123 | 12/1985 | Japan | 359/68 |
| 0051128 | 3/1986 | Japan | 359/68 |
| 0245138 | 10/1986 | Japan | 359/68 |

Primary Examiner—William L. Sikes
Assistant Examiner—Anita Pellman Gross
Attorney, Agent, or Firm—Fitzpatrick, Cella, Harper & Scinto

[57] ABSTRACT

An electrode plate with a color filter having a good planarity and suitable for a liquid crystal device is provided by forming on a transparent substrate a porous electroconductive film colored in a prescribed pattern by impregnation with an organic colorant. After being further coated with an insulating film and an alignment film, the electrode plate with a color filter may be applied to another electrode plate with a spacer therebetween to form a cell, which is then filled with a liquid crystal to form a liquid crystal device.

3 Claims, 2 Drawing Sheets

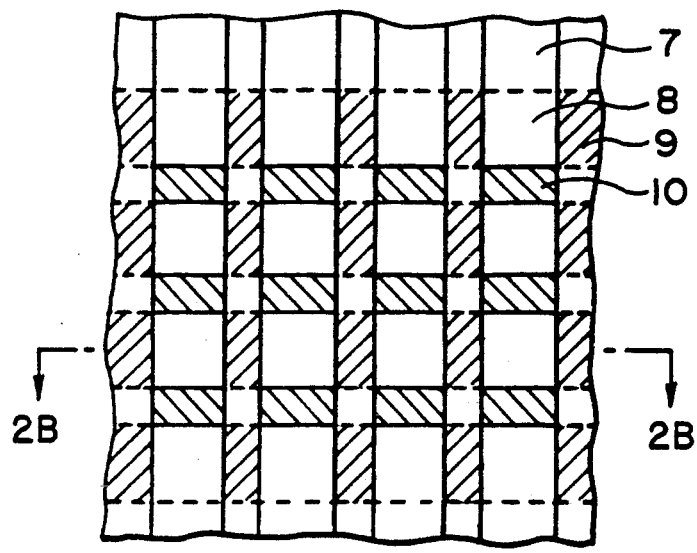
F I G. 2A
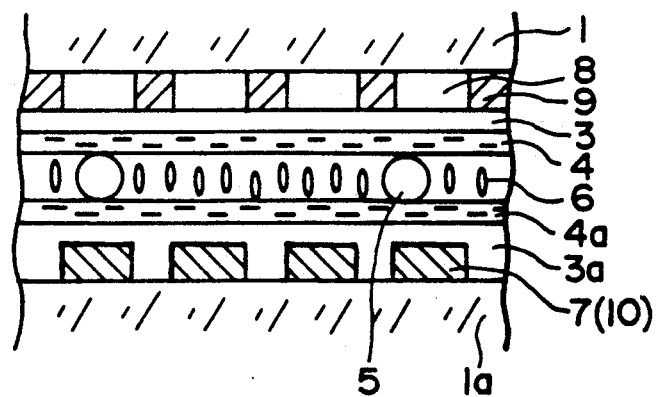
F I G. 2B

2
ELECTRODE PLATE WITH CONDUCTIVE COLOR FILTER

FIELD OF THE INVENTION AND RELATED ART

The present invention relates to an electrode plate to be used in a liquid crystal display device, etc., particularly an electrode plate with a color filter.

As a color filter used in a liquid crystal device, etc., there is known a dyed color filter which is obtained by forming a dyeable layer of a hydrophilic polymer, such as gelatin, casein, glue or polyvinyl alcohol and then dyeing the dyeable layer to form a color layer.

Such a dyed color filter has an advantage that many dyes are available so that it is easy to obtain a desired spectral characteristic but is accompanied with a difficulty of a poor yield because the production process involves a wet step requiring a difficult control of dipping the dyeable layer within a dyeing bath containing a dye dissolved therein and also a complicated step of providing an intermediate layer for dye-prevention between respective colors. Further, the heat resistance of the available dyes is about 150° C. or below and is thus relatively low, so that it is not applicable when the filter is subjected to a thermal treatment, and the resultant dyed film per is accompanied with a poor reliability in respects of heat resistance and light fastness.

On the other hand, there has been also known a type of color filter which comprises a colored resin obtained by dispersing a certain colorant or pigment in a transparent resin.

For example, a color filter obtained by mixing a colorant within a polyamine-type resin (as disclosed in, e.g., Japanese Laid-Open Patent Applications (JP-A) 46325/1983, 78401/1985, 184202/1985, 184203/1985, 184204/1985 and 184205/1985) is excellent in properties, such as heat resistance and light-fastness. As the resin is not photosensitive, the patterning of a color filter requires a printing process which is not advantageous for fine pattern formation or a process involving complicated steps of forming a mask of a resist on a colored resin film and then etching the colored resin film.

Further, a color filter formed as a colored resin film obtained by mixing a colorant within a photosensitive resin (as disclosed in JP-A 16407/1982, 74707/1982, 129707/1982, etc.), allows a simple process including only ordinary photolithographic steps of fine patterning.

In the case of forming a color filter by using such a colored resin comprising a mixture of a photosensitive resin and a colorant, however, the colorant per se generally has a light absorption in the exposure wavelength region, so that a larger exposure energy is required for photocuring of the photosensitive resin than in ordinary cases.

Photointensity at the time of exposure through a photosensitive resin layer generally decreases exponentially with the depth from the photoirradiation surface. Accordingly, the attenuation of incident light intensity becomes remarkably large along the depth from the photoirradiation surface when a light-absorptive colorant is contained in the photosensitive resin, so that photocuring of the photosensitive colored resin is liable to be insufficient in the neighborhood of the bottom of the resin layer, i.e., the boundary with the substrate, thus causing peeling of the resin layer at the time of development in some cases.

Further, if the exposure energy is remarkably increased so as to compensate for the attenuation of incident light intensity, the deterioration of the colorant per se can be caused.

Further, the inclusion of a colorant can cause a roughening of the colored resin film surface, leading to a deterioration of the color filter performance due to scattering at the color filter surface and also a disorder of alignment of liquid crystal molecules when the color filter layer is disposed on the inner side of the liquid crystal device.

As described above, the production of a color filter by using a mixture colored resin of a photosensitive resin and a colorant has left problems in respects of stability and durability of the resultant color filter film and performance of the color filter.

In order to solve the above-mentioned problems, our research group has proposed a color filter which may be patterned effectively at a lower exposure energy with less deterioration of a colorant at the time of exposure and with less fluctuation in photocuring in the thickness-wise direction to provide a colored resin film with a smoother surface state. More specifically, the color filter is one having a plurality of patterned color resin layers formed by using a colored resin obtained by dispersing at least a colorant in a photosensitive resin and repeating photolithographic steps and characterized in that the colorant is present in the colored resin layer in a gradually increasing amount from the surface toward the bottom of the colored resin layer.

However, if a color filter is directly formed on a transparent substrate by using a colored resin as described above, a difference in thickness is liable to occur between respective color segments and a gap is formed between respective color segments. Such a difference in thickness and a gap are not completely removed even if an overcoating is applied thereon, but lead to a deterioration in display quality or a failure of display in an even worse case, e.g., when a display panel using a ferroelectric liquid crystal is produced.

In order to alleviate such a defect, it has been tried to form on a transparent substrate a porous film having pores with a diameter of several hundreds to several thousands angstroms of an inorganic material, such as glass, $SiO_2$, $Ta_2O_5$, $Al_2O_3$, $WO_3$, etc.

This method however involves a difficulty that it is necessary to form such an inorganic porous film and the color filter production process is required to include an additional step of forming an inorganic film.

SUMMARY OF THE INVENTION

In view of the above-mentioned problems of the prior art, an object of the present invention is to provide an electrode plate with a color filter having a good surface state equivalent to a ordinary ITO film without using an additional colored layer as used in the prior art.

According to the present invention, there is provided an electrode plate with a color filter, comprising: a transparent substrate, and a porous electroconductive film disposed on the transparent substrate and colored in a prescribed pattern by impregnation with an organic colorant.

The present invention also provides a liquid crystal device including such an electrode plate with a color filter.

These and other objects, features and advantages of the present invention will become more apparent upon a consideration of the following description of the preferred embodiments of the present invention taken in conjunction with the accompanying drawings, wherein like reference numerals denote like parts.

BRIEF DESCRIPTION OF THE DRAWINGS

FIG. 2A is a partial plan view of another liquid crystal device including an electrode plate with a color filter according to the present invention, and FIG. 2B is a partial sectional view taken along the B—B line in FIG. 2A.

DESCRIPTION OF THE PREFERRED EMBODIMENTS

Figure 1:
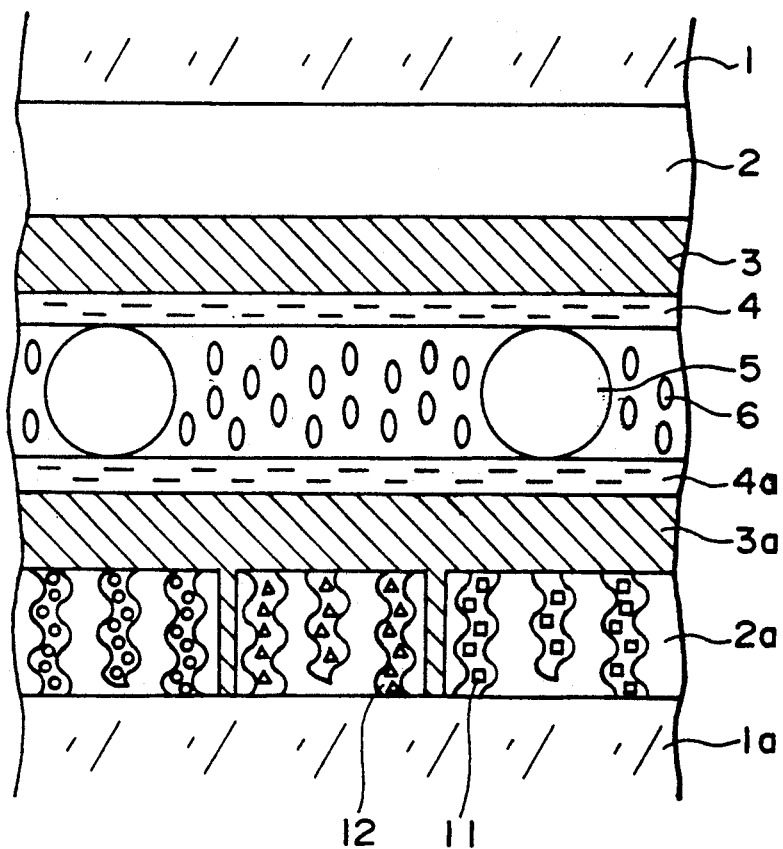
FIG. 1 is a partial sectional view of a liquid crystal device including an electrode plate with a color filter according to the present invention.

FIG. 1 is a partial sectional view of a liquid crystal device (cell) incorporating an electrode plate with a color filter according to the present invention.

Referring to FIG. 1, the liquid crystal device includes transparent substrates 1 and 1a, a transparent electrode 2, a porous transparent electrode 2 including pores 12 impregnated with an organic colorant 11, transparent insulating layers 3 and 3a, alignment films 4 and 4a for liquid crystal alignment, spacers 5 for retaining a cell gap, and a liquid crystal 6 disposed between the alignment films 4 and 4a.

Referring to FIG. 1, the electrode plate with a color filter according to the present invention has a structure including a transparent substrate 1a and a transparent electrode comprising a porous transparent conductor film 2a. The porous conductor film 2a includes pores 12 which are impregnated with an organic colorant 11 to form a colored pattern in the conductor film 2a.

The porous conductor film 2a may preferably be formed by coating the substrate 1a by, e.g., printing, spin coating or dipping with a solution of a mixture of an organic indium compound and an organic tin compound, followed by calcination at a temperature around 250° C. to form a porous indium tin oxide in a thickness of about 5000 Å to 3 microns. During the calcination, the solvent in the coating solution is evaporated to form enormous pores at the traces or paths of solvent evaporation. The pores may have various depths ranging from those reaching the substrate 1a to shallow ones. The pore diameters are at most several angstroms, so that they do not substantially affect the surface roughness, thus allowing an average roughness on the order of around 20 Å.

The organic indium compound used for forming a porous transparent electrode 2a may include, for example, alkoxy indium compounds, such as $InOC_3H_7)_3$ and $InOC_2H_5)_3$, and indium acetylacetonate. On the other hand, the organic tin compound may include, for example, alkyltins, such as tetramethyltin, tetraethyltin, and tetrapropyltin; halogenoalkyltins, such as methyltrichlorotin, dimethyldichlorotin, and trimethylchlorotin; halogenoalkoxytins, such as trimethoxychlorotin, ethoxytrichlorotin, and diethoxydichlorotin; and alkoxytins, such as tetramethoxytin and tetraethoxytin.

The organic tin compound may be mixed with the organic indium compound in an appropriate ratio in the range of 0.01 wt. part–100 wt. parts per 1 wt. part of the organic indium compound.

The mixture of the organic indium compound and organic tin compound may be dissolved in an appropriate concentration of e.g., 0.1–30 wt. %, in an appropriate organic solvent, examples of which may include: alcohols, such as ethanol, methanol, butanol, and isopropyl alcohol; ketones, such as acetone, methyl ethyl ketone, and dimethyl ketone; cyclic ethers, such as tetrahydrofuran and dioxane; and mixture of these.

In the present invention, it is particularly preferred to incorporate a high-boiling point solvent such as glycerin in a proportion of about 10 wt. % for the purpose of producing a porous ITO film.

The porous transparent electrode film 2a is impregnated with an organic colorant in a pattern corresponding to a desired color filter pattern by covering the other parts with a resist mask. The organic colorant is not particularly restricted but may be selected according to a desired spectral characteristic from a wide scope of organic colorants inclusive of dyes and pigments, examples of which may include: azo dyes and pigments, such as soluble azo compounds, insoluble azo compounds and condensed azo compounds; other dyes and pigments, such as phthalocyanines, indigos, anthraquinones, perylenes, perynones, dioxazines, quinacrydones, isoindolinones, phthalones, methines, azomethines, other condensed polycyclic compounds including metal complexes, and mixtures of these. In a preferred embodiment, a black organic colorant inclusive of carbon black, is used.

These organic colorants may be used for impregnation after being dissolved or dispersed in an appropriate solvent, examples of which may include: hydrocarbons, halogenated hydrocarbons, alcohols, ethers, acetals, ketones, polyhydric alcohols and derivatives thereof, organic solvents containing nitrogen, sulfur or phosphorus, and water.

The porous transparent electrode 2a thus produced is most characterized in that it includes a colored pattern functioning as a color filter therein and yet provides a surface state which is comparable to that of an ITO film produced by an ordinary process such as sputtering. This characteristic is most advantageously used in a ferroelectric liquid crystal device because the alignment of a ferroelectric liquid crystal is sensitively affected by a roughness of a surface in contact therewith, so that it also requires a smooth underlying layer.

As described above, the electrode plate with a color filter according to the present invention is constituted by coating a transparent substrate with a porous conductor film functioning as an electrode and the pores therein are locally selectively impregnated with an organic colorant to form a prescribed color pattern while retaining a surface flatness free from a stepwise difference in height.

Hereinbelow, the present invention will be more specifically explained based on Examples.

EXAMPLE 1

A ferroelectric liquid crystal display device having a structure as explained with reference to FIG. 1 was prepared.

Two 1.1 mm-thick blue glass plates were surface-polished to provide transparent substrates 1 and 1a. On the transparent substrate 1, an ITO film was formed by sputtering in a thickness of 1500 Å and patterned into transparent electrodes 2 to be used as common electrodes. The ITO film thus formed showed a surface roughness of about 20 Å. On the other hand, a solution of a mixture of triethoxyindium and tetramethyltin in a weight ratio of 1:1 in a concentration of about 10 wt. % was applied by printing on the transparent substrate 1a and calcined to form a 5000 Å-thick porous ITO film, which was then patterned and impregnated with organic colorants of R, G and B to form colored porous transparent electrodes 2a. The impregnated ITO film showed a surface resistivity of about 150 ohm/cm$^2$, which has almost as before the impregnation.

The above-treated substrates 1 and 1a provided with the electrodes 2 and 2a were further coated with an SiO$_2$ precursor solution by printing, followed by calcination to form 1000 Å-thick SiO$_2$ insulating layers 3 and 3a, which were then coated with 200 Å-thick alignment films 4 and 4a by printing and calcination.

The thus treated substrates 1 and 1a were applied to each other with 1.3 micron-dia. SiO$_2$ spacer beads to form a cell, which was then filled with a pyrimidine-type ferroelectric liquid crystal (showing a phase transition series of isotropic → cholesteric → smectic A → chiral smectic C) to form a display device.

The thus-prepared display device provided a color display with a pale hue which was easy to see because of a thick color filter layer.

EXAMPLE 2

A simple matrix-type liquid crystal panel having a structure as shown in FIGS. 2A and 2B was prepared.

Transparent substrates 1a and 1 were respectively provided with 5000 Å-thick porous stripe ITO electrodes 7 and 8 by printing and calcination so as to form common electrodes and data electrodes intersecting each other to form a pixel at each intersection. Parts 9 of the porous stripe ITO electrodes 8 corresponding to parts between pixels (between common electrodes) were impregnated with a black organic colorant so as to prevent light leakage therethrough. On the other hand, parts 10 of the porous ITO electrodes 7 corresponding to parts between pixels (between data electrodes) were likewise impregnated with a black organic colorant. Then, the substrates 1 and 1a thus treated were coated with insulating films 3 and 3a by printing, and with alignment films 4 and 4a by printing. Then, the thus treated substrates 1 and 1a were applied to each other with spacer beads 5 disposed therebetween to form a cell, which was then filled with a liquid crystal 6.

The organic colorant used for coloring the parts 9 and 10 was carbon black dispersed in an acrylic resin, whereby these parts were colored in black to provide a transmittance of about 20%, which was sufficient to prevent light leakage between pixels in a display. As a result of prevention of light leakage through between pixels, an increased contrast was attained between the white display state and the black display state.

As described hereinabove, according to the present invention, there is provided an electrode plate with a color filter having a surface state comparable to that of an ITO film formed through an ordinary process without providing a particular colored layer, by providing a porous electrode and impregnating the pores of the porous electrode with a colorant in a prescribed pattern.

What is claimed is:

1. A liquid crystal device, comprising:
   a first electrode plate comprising a transparent substrate, a porous electroconductive film colored in a prescribed pattern by impregnation with an organic colorant, an insulating film and an alignment film;
   a second electrode plate comprising a transparent substrate, a transparent electrode, an insulating film and an alignment film;
   a spacer member disposed to define a gap between the first and second electrode plate; and
   a liquid crystal disposed to fill the gap between the first and second electrode plates.

2. An electrode plate with a color filter, comprising: a transparent substrate, and a porous electroconductive film disposed on the transparent substrate and colored in a prescribed pattern by impregnation with an organic colorant.

3. An electrode plate according to claim 2, wherein said organic colorant is a black colorant.

* * * * *